United States Patent [19]

Gage et al.

[11] 4,109,567

[45] Aug. 29, 1978

[54] CAMP GRILL

[76] Inventors: Michael H. Gage, 3505 Woodhaven Dr., Erie, Pa. 16506; Phillip H. Zacks, 636 Hilltop Rd., Erie, Pa. 16509

[21] Appl. No.: 645,410

[22] Filed: Dec. 30, 1975

[51] Int. Cl.² .................. A47J 33/00; A47J 37/00; A47J 37/07

[52] U.S. Cl. .................. 99/450; 126/25 A; 211/181; 248/188.2

[58] Field of Search ............. 99/450, 340, 448, 449; 126/9, 25, 29–30, 137; 211/181, 187, 188.2, 208; 248/125, 354 L, 327, 307, 310, 312; 108/106, 110; 34/189, 237–239

[56] References Cited

U.S. PATENT DOCUMENTS

| 758,015 | 4/1904 | Miller | 126/30 X |
|---|---|---|---|
| 2,477,529 | 7/1949 | Sprinkle et al. | 126/9 R |
| 2,559,710 | 7/1951 | Danielsen | 126/9 R |
| 2,974,662 | 3/1961 | Forrest | 126/9 R X |
| 3,029,754 | 4/1962 | Doyle | 126/25 R X |
| 3,162,113 | 12/1964 | Tallaksen | 99/450 X |
| 3,176,676 | 4/1965 | Caldwell | 126/25 R |
| 3,191,592 | 6/1965 | Lorbacher | 126/25 R |
| 3,489,131 | 4/1968 | Richins | 126/9 R |
| 3,523,508 | 8/1970 | Maslow | 211/181 X |
| 3,641,922 | 2/1972 | Nachazel et al. | 99/340 |

FOREIGN PATENT DOCUMENTS 280,131  4/1952  Switzerland .................. 99/450

Primary Examiner—Harvey C. Hornsby
Assistant Examiner—Timothy F. Simone
Attorney, Agent, or Firm—Charles L. Lovercheck

[57] ABSTRACT

A camp grill for cooking over an open fire is disclosed. The grill has a top with hollow cylindrical leg holders each telescopically receiving one of the four legs. Each leg has axially-spaced, radially and outwardly extending lugs disposed in alignment with each other. To adjust the height of the grill, the leg holders can be adjusted by aligning them with the slots in the cylindrical holders, sliding the legs to the proper vertical position and rotating them so that the lugs underly the holders.

3 Claims, 7 Drawing Figures

U.S. Patent  Aug. 29, 1978  4,109,567
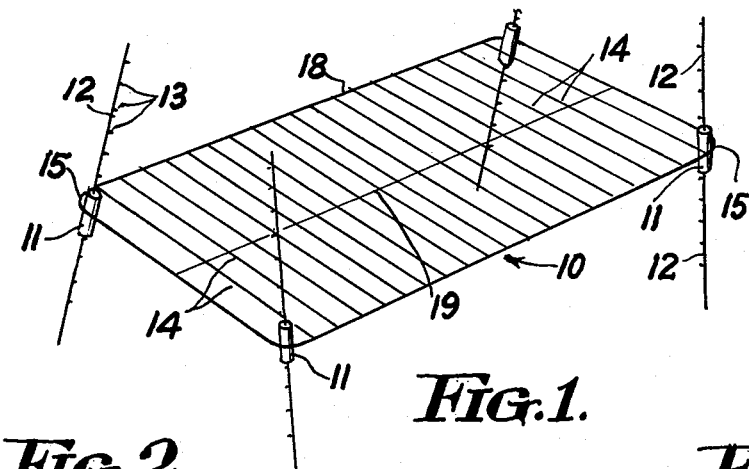
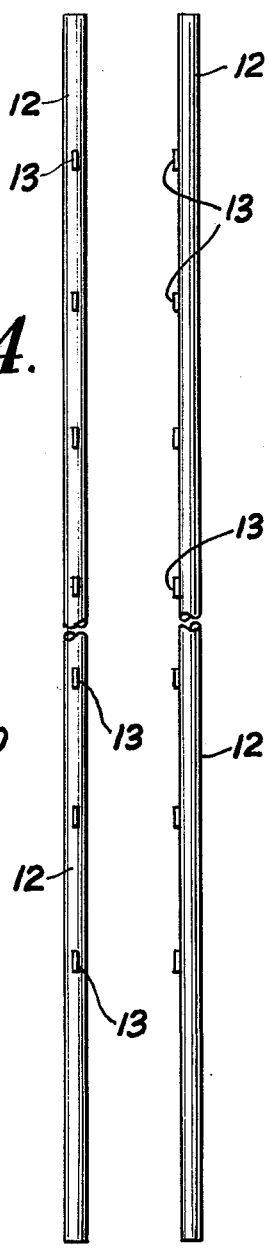
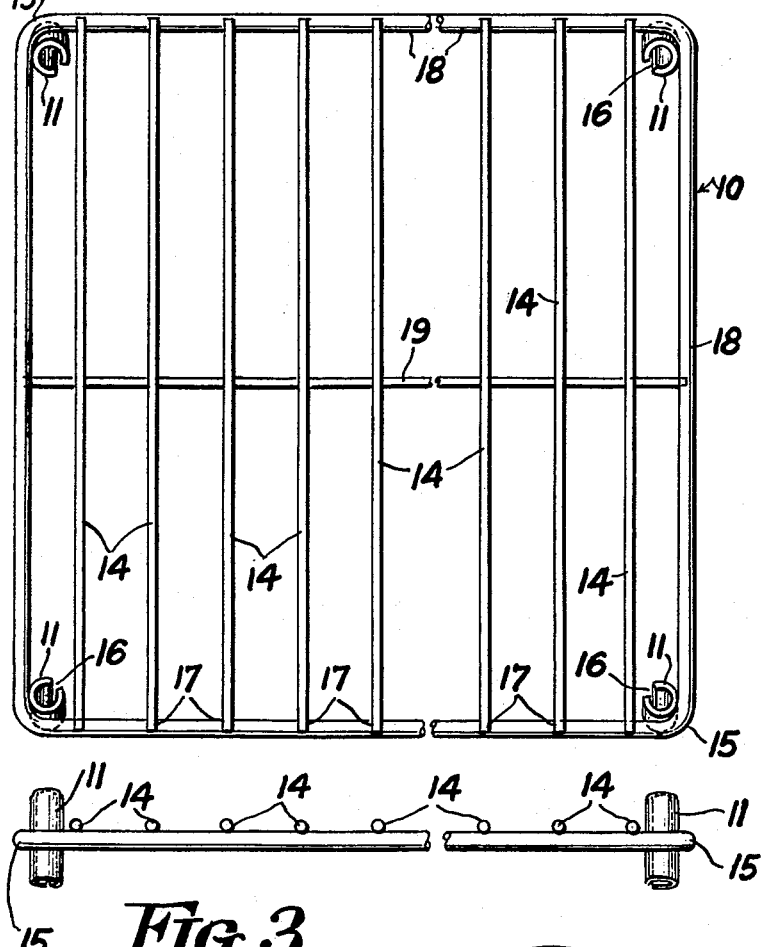
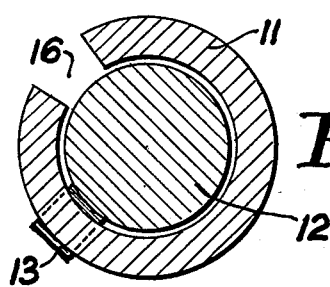

CAMP GRILL

OBJECTS OF THE INVENTION

It is an object of the invention to provide an improved camp grill.

Another object of the invention is to provide a grill that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

REFERENCE TO PRIOR ART

The present application involves an improvement over barbecue grills such as shown in U.S. Pat. No. 3,224,357 issued to George J. Rubens in 1965.

GENERAL DESCRIPTION OF DRAWINGS

FIG. 1 is an isometric view of the campfire grill according to the invention.

FIG. 2 is a top view of the grill.

FIG. 3 is an end view of the grill shown in FIG. 2.

FIG. 4 is a side view of the grill shown in FIGS. 2 and 3 with legs removed.

FIG. 5 is an enlarged side view of the legs for the grill.

FIG. 6 is an enlarged side view taken at 90° to the view shown in FIG. 5.

FIG. 7 is a cross-sectional view taken through the leg holders and legs.

DETAILED DESCRIPTION OF DRAWINGS

Now, with more particular reference to the drawings, a camp grill is shown to be used over an open campfire for cooking purposes. The grill is designed with five parts which are a top 10, specially designed leg holders 11 and four specially designed legs which give positive holding action. The grill may be adjusted so that it is supported between 9 to 22¼ inches above ground level. The leg holders 11 are welded to the marginal rod 15 at each corner, and the corners may be bent in the radius of the leg holders 11. The leg holders 11 have an inside diameter slightly larger than the outside diameter of the legs 12 so that the legs 12 are freely slidable in the leg holders. The outwardly protruding lugs 13 are flattened from the material composing the legs 12 and are disposed in axial alignment and are vertically spaced on the legs 12. These legs 12 can be rotated so that the lugs 13 are freely slidable through the slot 16 in each leg holder 11. When the leg 12 has slid to the proper position, it is rotated from the slot so that the lug 13 underlies the end of the cylindrical leg holder 11. This gives a firm, safe grill that will not collapse in use. Each leg can be individually adjusted by manually turning it to align the lug 13 with the slot in the leg holder. When the grill is to be transported or stored, the legs 12 can be rotated to align the lug 13 with the slots 16 and the legs can then be pulled out and the legs stored with the legs lying across the spaced rods 14. The entire assembly can then be fitted into a suitable carton for transportation or storage. The grill can be easily set up by reversing the procedure.

The ends 17 on the transfer slots 14 rest on the marginal rod 18 which is bent in a rectangular form and may have its ends welded together to form a continuous rectangular enclosure. A laterally extending rod 19 can support the intermediate parts of the rods 14 and hold them in rigid, spaced relation to each other. As indicated in FIG. 4, the holders 11 can be inclined downwardly and outwardly at say 5° in order to increase the stability of the device. The slot 16 in each of the holders will face the corner of the grill diametrically opposite so that the lugs 13 will be rotated outward to interfere less with the work in removing or placing food on the grill.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A camp grill comprising a grill top generally rectangular in shape and having an outer marginal wire,
    spaced, laterally-extending support wires having their ends supported on said marginal wire and affixed thereto,
    a hollow, cylindrical leg holder fixed to said marginal wire at each corner thereof,
    each said leg holder having an axially-extending slot extending from end to end therein forming a path through which lugs can move from a position spaced from one end of said cylindrical holder to a position spaced from another end of the particular cylindrical holder,
    a plurality of legs,
    each said leg being generally cylindrical in shape and having an outside diameter slightly smaller than the inside diameter of each said hollow, cylindrical holder and slidably received in the hollow of said leg holder,
    axially-spaced lugs fixed to said legs,
    each said lug having a width less than the width of said slot in said leg holder and being adapted to slide through said slot for adjusting the position of said legs and to be rotated to underlie said leg holder in use whereby said lugs support said grill on said legs selectively at different positions.

2. The camp grill recited in claim 1 wherein said legholders incline outwardly and downwardly at an angle approximately 5°.

3. The camp grill recited in claim 1 wherein said lugs are axially aligned with each other.

* * * * *